(12) United States Patent
Christiansen

(10) Patent No.: US 10,759,474 B2
(45) Date of Patent: Sep. 1, 2020

(54) STOWABLE STEERING WHEEL

(71) Applicant: Ford Global Technologies, LLC, Dearborn, MI (US)

(72) Inventor: Jens Christiansen, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 180 days.

(21) Appl. No.: 15/947,900

(22) Filed: Apr. 9, 2018

(65) Prior Publication Data

US 2019/0308662 A1    Oct. 10, 2019

(51) Int. Cl.
| | | |
|---|---|---|
| *B62D 6/00* | (2006.01) | |
| *B62D 15/02* | (2006.01) | |
| *B62D 5/04* | (2006.01) | |
| *B60W 50/00* | (2006.01) | |
| *B60W 50/10* | (2012.01) | |
| *B60R 16/027* | (2006.01) | |
| *B62D 3/14* | (2006.01) | |

(52) U.S. Cl.
CPC ........... *B62D 6/003* (2013.01); *B62D 5/0457* (2013.01); *B62D 15/021* (2013.01); *B60R 16/027* (2013.01); *B60W 50/10* (2013.01); *B60W 2050/0005* (2013.01); *B62D 3/14* (2013.01)

(58) Field of Classification Search
CPC .... B62D 6/003; B62D 5/0457; B62D 15/021; B62D 3/14; B60R 16/027; B60W 50/10; B60W 2050/0005
See application file for complete search history.

(56) References Cited

U.S. PATENT DOCUMENTS

| 6,070,686 | A * | 6/2000 | Pollmann ............ B60R 25/0221 |
| | | | 180/287 |
| 6,729,647 | B2 * | 5/2004 | Shapiro .................. B62K 15/00 |
| | | | 180/208 |
| 8,550,488 | B1 * | 10/2013 | Inui ..................... B62D 33/0621 |
| | | | 280/643 |
| 9,630,644 | B2 | 4/2017 | Soderlind |
| 9,840,279 | B2 | 12/2017 | Abbas et al. |
| 9,862,403 | B1 * | 1/2018 | Rouleau ................. B62D 1/181 |
| 10,351,161 | B2 * | 7/2019 | Buzzard ................ B62D 1/185 |
| 10,421,476 | B2 * | 9/2019 | Rouleau ................ B62D 1/181 |
| 10,442,455 | B2 * | 10/2019 | McKinzie ............. B62D 1/181 |
| 10,513,273 | B1 * | 12/2019 | Stark ..................... G05D 1/0088 |
| 2014/0260761 | A1 * | 9/2014 | Soderlind ............. B62D 1/181 |
| | | | 74/493 |
| 2015/0142246 | A1 * | 5/2015 | Cuddihy ............... B62D 1/183 |
| | | | 701/23 |
| 2015/0142273 | A1 * | 5/2015 | Cuddihy ............... B60N 2/005 |
| | | | 701/49 |

(Continued)

FOREIGN PATENT DOCUMENTS

| CN | 206086849 U | 4/2017 | |
| WO | WO 03020572 A1 * | 3/2003 | ............... B62D 1/00 |
| WO | WO 2003020571 A1 * | 3/2003 | ............... B62D 1/00 |

*Primary Examiner* — Calvin Cheung
(74) *Attorney, Agent, or Firm* — Frank A. MacKenzie; Bejin Bieneman PLC

(57) ABSTRACT

A system includes a processor and a memory storing program instructions executable by the processor to determine that a steering wheel is one of engaged and disengaged with a steering based on a detected deflection of a steering torsion bar. The memory stores instructions to actuate the steering based on the determination.

15 Claims, 8 Drawing Sheets

(56) References Cited

U.S. PATENT DOCUMENTS

| | | | |
|---|---|---|---|
| 2016/0304123 A1* | 10/2016 | Lewis | B62D 5/0421 |
| 2016/0362117 A1 | 12/2016 | Kaufmann et al. | |
| 2016/0368522 A1* | 12/2016 | Lubischer | B62D 1/181 |
| 2016/0375926 A1* | 12/2016 | Lubischer | B62D 1/183 |
| | | | 74/493 |
| 2017/0174203 A1* | 6/2017 | Brown | B60R 21/205 |
| 2017/0225570 A1* | 8/2017 | El Aile | B60R 21/203 |
| 2017/0267285 A1* | 9/2017 | Abbas | B62D 1/00 |
| 2017/0341678 A1* | 11/2017 | Dekker | B62D 1/22 |
| 2018/0072339 A1* | 3/2018 | Bodtker | B62D 1/183 |
| 2018/0079441 A1* | 3/2018 | McKinzie | B62D 1/04 |
| 2018/0148084 A1* | 5/2018 | Nash | F16C 3/03 |
| 2018/0154932 A1* | 6/2018 | Rakouth | B62D 5/091 |
| 2018/0186266 A1* | 7/2018 | Fitzpatrick | B60N 3/063 |
| 2018/0229753 A1* | 8/2018 | Magnus | B62D 1/16 |
| 2018/0238400 A1* | 8/2018 | Magnus | F16D 15/00 |
| 2018/0304779 A1* | 10/2018 | Fitzpatrick | B60N 2/14 |
| 2018/0370559 A1* | 12/2018 | Swamidason | B62D 1/18 |
| 2019/0002010 A1* | 1/2019 | Cao | B62D 5/04 |
| 2019/0113913 A1* | 4/2019 | Ryne | G05D 1/0061 |
| 2019/0185041 A1* | 6/2019 | Shin | B62D 1/04 |
| 2019/0185042 A1* | 6/2019 | Lee | B62D 1/04 |
| 2019/0185044 A1* | 6/2019 | Pichonnat | B62D 1/197 |
| 2019/0241213 A1* | 8/2019 | Szepessy | B62D 5/043 |

\* cited by examiner

STOWABLE STEERING WHEEL

BACKGROUND

A vehicle steering system controls a steering angle of the vehicle. Vehicle steering may be controlled by a human operator via a steering wheel, and/or by a computer in communication with the steering. The steering wheel may engage and disengage vehicle steering via a torsion bar. Operation of the steering may depend on whether the steering wheel is engaged or disengaged.

DETAILED DESCRIPTION

Introduction

Figure 1:
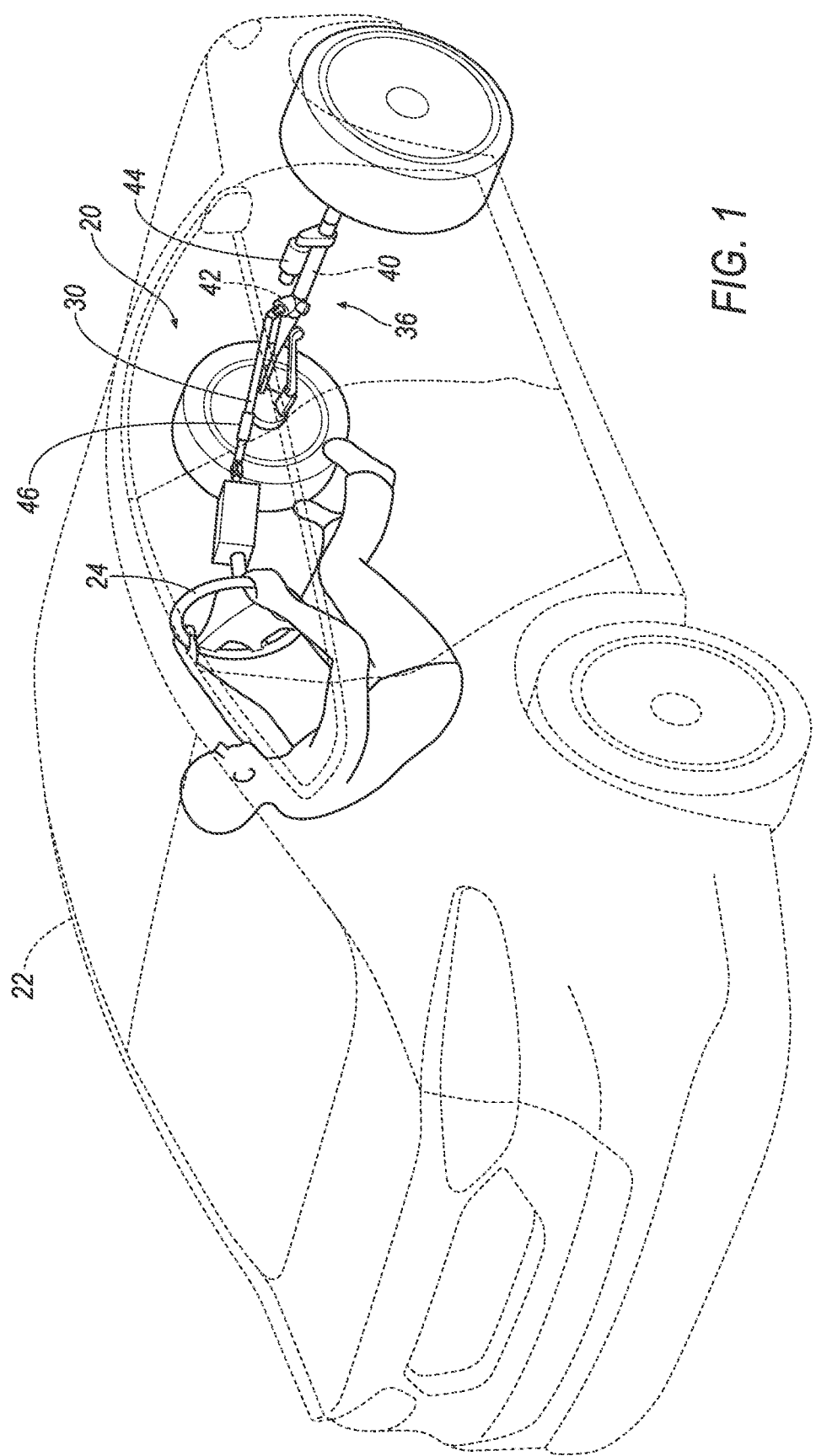
FIG. 1 is a perspective view of an example vehicle and a steering of the vehicle.

A system includes a processor and a memory storing program instructions executable by the processor to determine that a steering wheel is one of engaged and disengaged with a steering based on a detected deflection of a steering torsion bar. The memory further typically stores instructions to actuate the steering based on the determination.

The memory may store instructions to actuate the steering based on the determination by providing input to the steering according to one or more parameters selected according to the determination.

The one or more parameters may indicate a gain value.

The memory may store instructions to actuate the steering in one of an autonomous-mode, a semi-autonomous mode and a non-autonomous mode based on the determination.

The memory may store instructions to actuate the steering to disengage the steering wheel upon determining the steering wheel is engaged with the steering.

The memory may store instructions to actuate a user interface to provide a status of whether the steering wheel is engaged or disengaged from the steering.

The memory may store instructions to store a first fault code upon determining the steering wheel is engaged with the steering, and to store a second fault code that is different than the first fault code upon determining the steering wheel is disengaged from the steering.

A system includes a steering wheel. The system includes a steering including a torsion bar. The system includes a sensor arranged to detect a deflection of the torsion bar. The system includes means for determining that the steering wheel is one of engaged and disengaged with the steering based on a value of a detected deflection of the torsion bar.

The system may include means for actuating the steering based on the determination.

The steering may include an actuator arranged to control a steering angle of the steering.

The system may include means for actuating the steering based on the determination by providing input to the steering according to one or more parameters selected according to the determination.

The one or more parameters may indicate a gain value.

The system may include means for actuating the steering to disengage the steering wheel upon determining the steering wheel is engaged with the steering.

A method includes determining that a steering wheel is one of engaged and disengaged with a steering based on a detected deflection of a steering torsion bar. The method includes actuating the steering based on the determination.

The steering may be actuated based on the determination by providing input to the steering according to one or more parameters selected according to the determination.

The one or more parameters may indicate a gain value.

The steering may be actuated in one of an autonomous-mode, a semi-autonomous mode and a non-autonomous mode based on the determination.

The method may include actuating the steering to disengage the steering wheel upon determining the steering wheel is engaged with the steering and actuating the steering to engage the steering wheel upon determining the steering wheel is disengaged from the steering.

The method may include actuating a user interface to provide a status of whether the steering wheel is engaged or disengaged from the steering.

The method may include one of storing a first fault code upon determining the steering wheel is engaged with the steering and storing a second fault code that is different than the first fault code upon determining the steering wheel is disengaged from the steering.

A memory may store program instructions executable by a processor to perform the method.

A computer may be programmed to perform the method.

A system 20, shown in FIG. 1, for controlling a vehicle 22 having a steering wheel 24 that may be engaged and disengaged from a steering 36 includes a computer 28 (shown in FIG. 7) having a processor and a memory storing program instructions executable by the processor to determine that the steering wheel 24 is one of engaged and disengaged with the steering 36 based on a detected deflection of a torsion bar 30. The memory further typically stores program instructions executable by the processor to actuate the steering 36 based on the determination.

Determining whether the steering wheel 24 is engaged or disengaged with the steering 36 based on a detected deflection of the torsion bar 30 provides the computer 28 with increased accuracy and reliability in the making such determination. Actuating the steering 36 based on whether the steering wheel 24 is engaged or disengaged with the steering 36 enables the computer 28 to operate the vehicle 22 to provide a comfortable ride to occupants, to self-diagnose faults, to operate in an autonomous mode, a semi-autonomous mode, or a non-autonomous mode, etc.

System

The vehicle 22 may be any passenger or commercial automobile such as a car, a truck, a sport utility vehicle, a crossover vehicle, a van, a minivan, a taxi, a bus, etc.

The computer 28 may operate the vehicle 22 in an autonomous mode, a semi-autonomous mode, or a non-autonomous mode. For purposes of this disclosure, an autonomous mode is defined as one in which each of vehicle propulsion 32, braking 34, and steering 36 are controlled by the computer 28; in a semi-autonomous mode the computer 28 controls one or two of vehicle propulsion 32, braking 34, and steering 36; in a non-autonomous mode, a human operator controls the vehicle 22 propulsion 32, braking 34, and steering 36.

The propulsion 32 of the vehicle 22 is a system, i.e., a set of elements, including as described herein, that generates energy and translates the energy into motion of the vehicle 22. The propulsion 32 may be, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion 32. The propulsion 32 may include an electronic control unit (ECU) that controls the propulsion 32 and is in communication with the computer 28. The propulsion 32 is in communication with and receives input from the computer 28 and from a human driver. The human driver may control the propulsion 32 via, e.g., an accelerator pedal and/or a gear-shift lever.

The braking 34 is a system, i.e., a set of elements, including as described herein, that resists the motion of the vehicle 22 to thereby slow and/or stop the vehicle 22. The braking 34 may be friction brakes such as disc brakes, drum brakes, band brakes, etc.; regenerative brakes; any other suitable type of brakes; or a combination. The braking 34 may include an ECU that controls the braking 34 and is in communication with the computer 28. The braking 34 is in communication with and receives input from the computer 28 and a human driver. The human driver may control the braking 34 via, e.g., a brake pedal.

The steering 36 is a system, i.e., a set of elements, including as described herein, that controls a steering angle of wheels of the vehicle 22. The steering 36 may include the torsion bar 30, a rack 40 and a pinion 42. Movement of the rack 40 controls the steering angle of wheels of the vehicle 22. The pinion 42 is engaged with the rack 40 such that rotation of the pinion 42 causes movement of the rack 40. The pinion 42 is coupled to the torsion bar 30 such that rotation of the torsion bar 30 rotates the pinion 42.

The steering 36 may include an actuator 44 that moves the rack 40, e.g., in response to an instruction from the computer 28. The actuator 44 may be a motor arranged to rotate the pinion 42. For example, the motor may be connected to the torsion bar 30 via gears, belts, chains, etc. Additionally or as an alternative, the motor may be arranged to rotate a second pinion engaged with the rack 40. The actuator 44 may be a linear actuator, e.g., a screw type including a threaded shaft and hole, a hydraulic type including a piston and cylinder, etc., arranged to move the rack 40. For example, the linear actuator may be connected to the rack 40 and a frame and/or body of the vehicle 22. The steering 36 may include an ECU that controls the steering 36 and is in communication with the computer 28. For example, the ECU of the steering 36 may control the actuator 44, a linear actuator 52, a clutch 56, etc., of the steering 36 (discussed below). The steering 36 is in communication with and receives input from the steering wheel 24.

Figure 2:
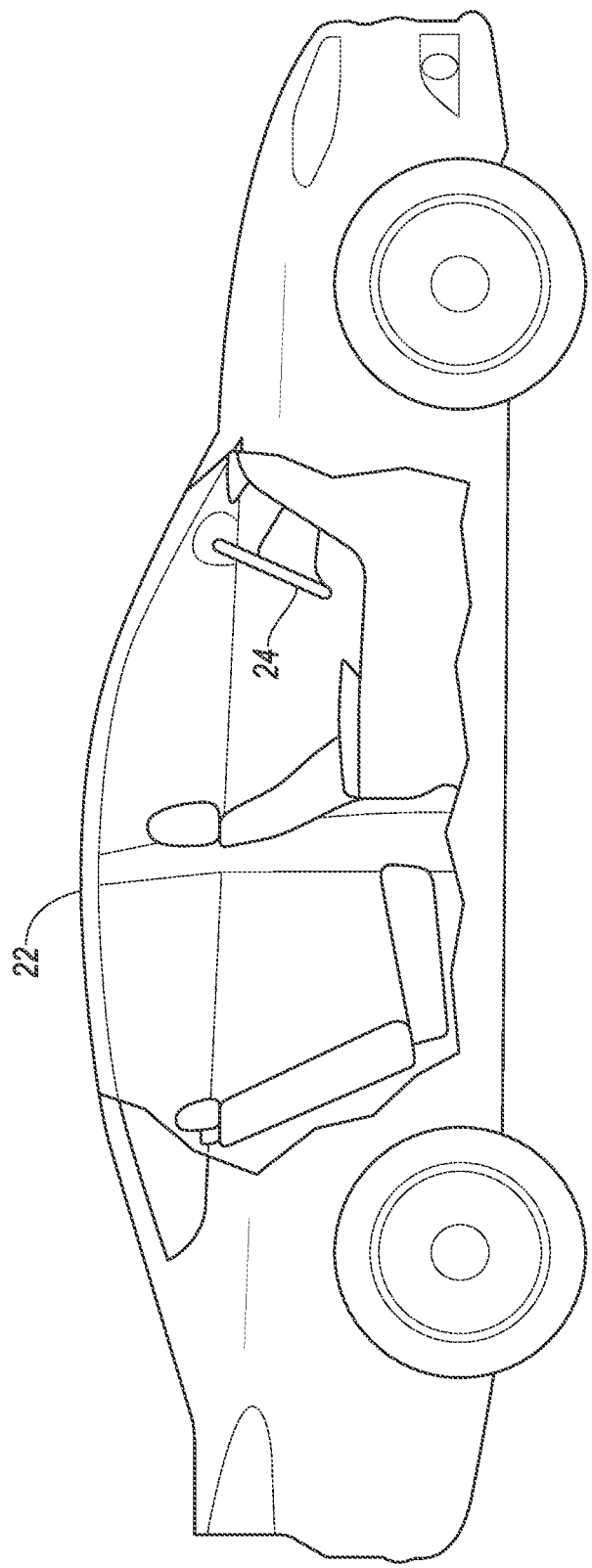
FIG. 2 is a side view of the vehicle with a steering wheel in an extended position.
Figure 3:
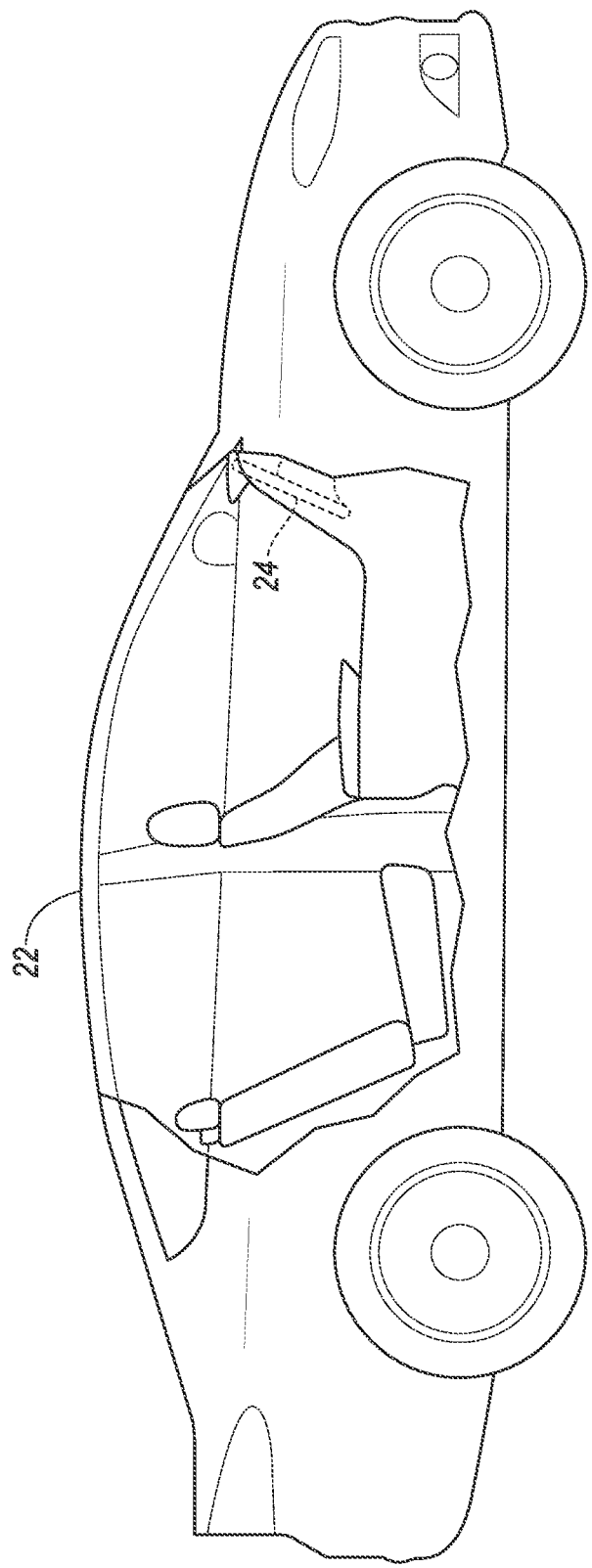
FIG. 3 is a side view of the vehicle with the steering wheel in a retracted position.

The steering wheel 24 allows an operator to steer the vehicle 22 by transmitting rotation of the steering wheel 24 to movement of the rack 40, e.g., rotation of the steering wheel 24 rotates the torsion bar 30 when the steering wheel 24 is engaged with the steering 36. The steering wheel 24 may be, e.g., a rigid ring selectively engageable and disengageable with the steering 36, e.g., with the torsion bar 30. For example, the steering wheel 24 may be moveable between a retracted position, shown in FIGS. 2 and 5, and an extended position, shown in FIGS. 1 and 4. In the extended position, splines 48 of the steering wheel 24 may engage splines 50 of the torsion bar 30. In the retracted position, the splines 48 of the steering wheel 24 may be disengaged from the splines 50 of the torsion bar 30. Other structures may be used to engage the steering wheel 24 and the steering 36.

The steering 36 may include a deflection sensor 46 arranged to detect a deflection of the torsion bar 30. For example, the deflection sensor 46 may be strain sensor fixed to the torsion bar 30, a hall effect sensor supported proximate the torsion bar 30, or any other type of sensor suitable for detecting a deflection of the torsion bar 30.

Figure 4:
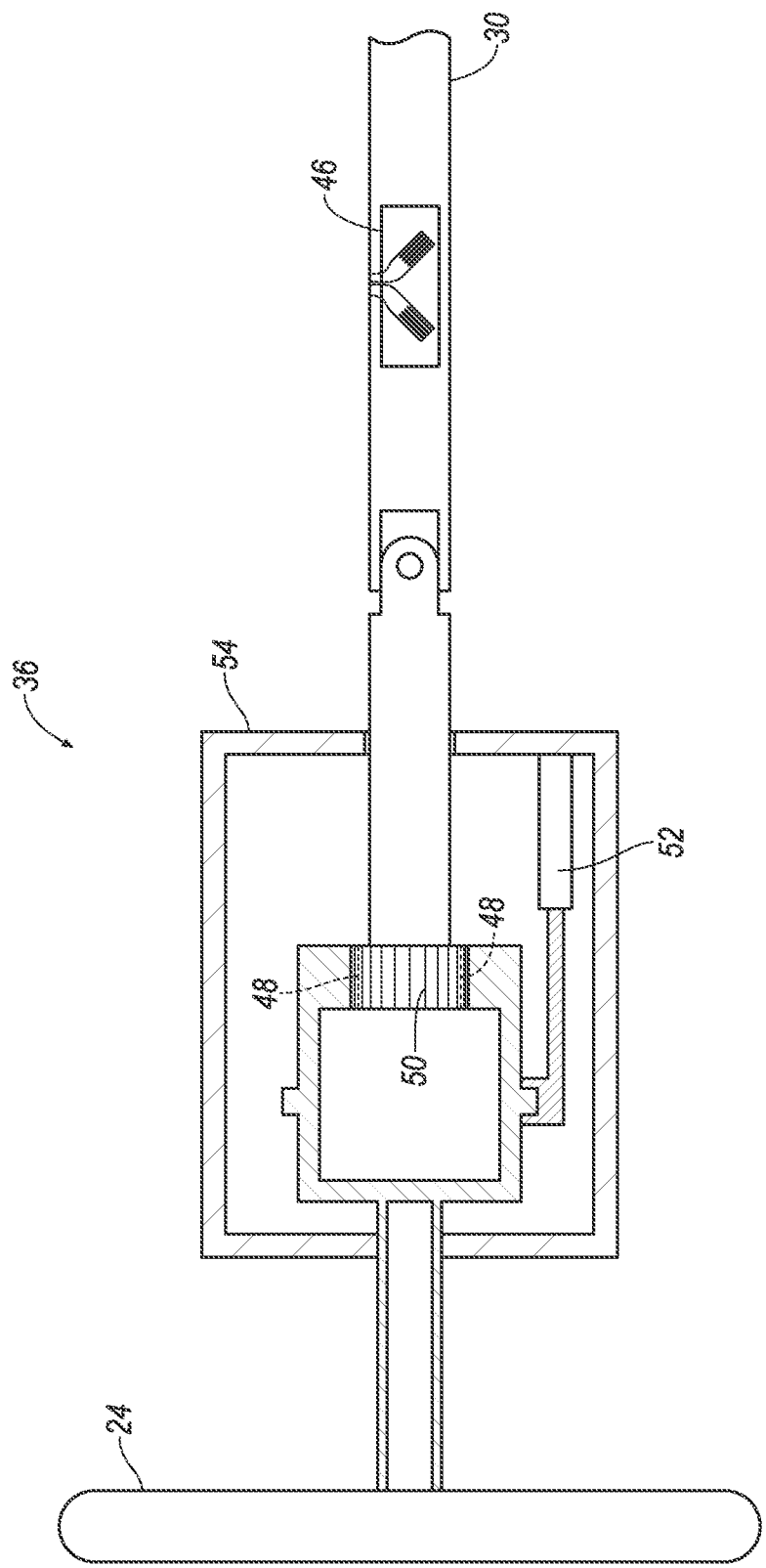
FIG. 4 is a cross section of the steering with the steering in the extended position.
Figure 5:
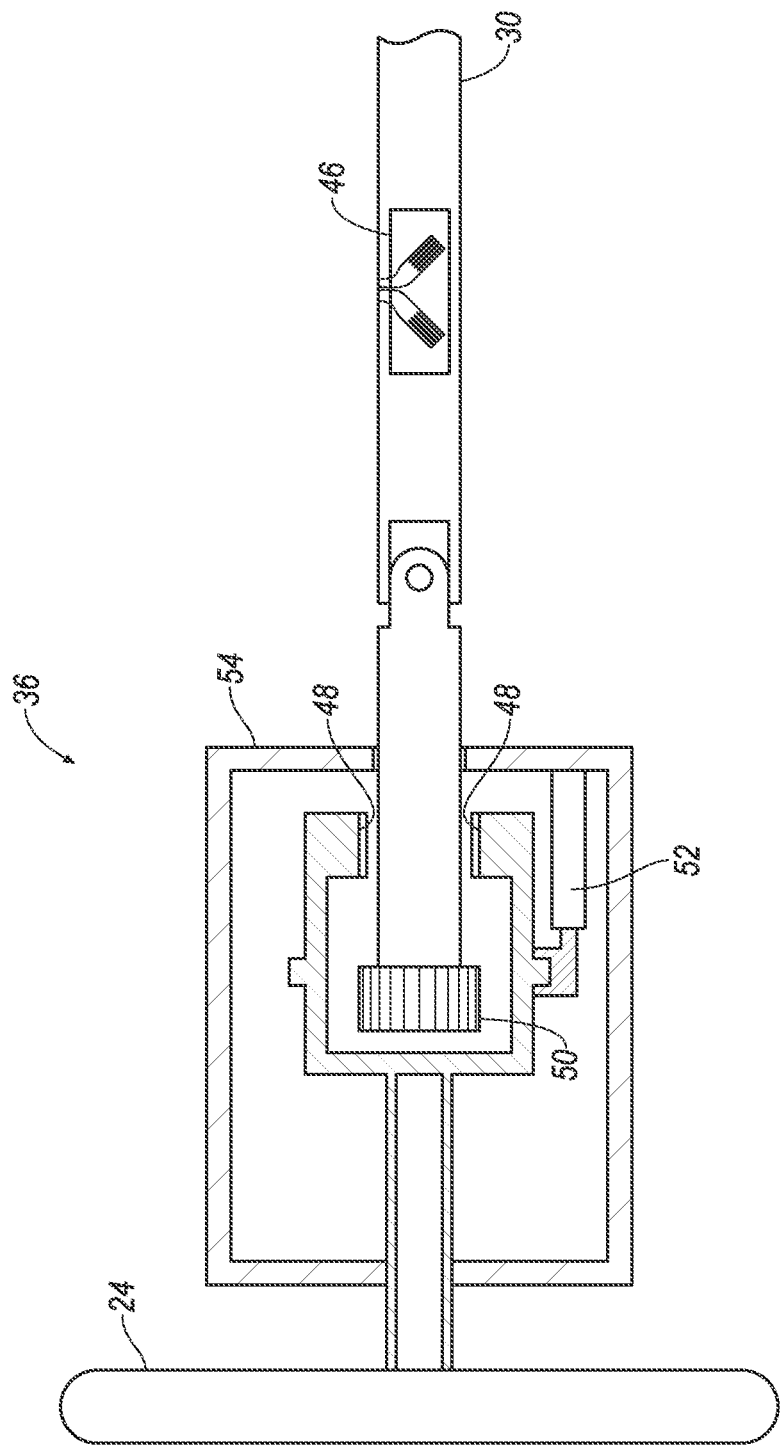
FIG. 5 is a cross section of the steering with the steering in the retracted position.

With reference to FIGS. 4 and 5, the steering 36 may include the linear actuator 52 or the like that moves the steering wheel 24 between the extended position and the retracted position. For example, the linear actuator 52 may be a screw type including a threaded shaft and hole, a hydraulic type including a piston and cylinder, a rack and pinion type, etc. The linear actuator 52 may be fixed to a support 54, such as a cross-bar or other component of an instrument panel of the vehicle 22, and fixed to the steering wheel 24. Extension and retraction of the linear actuator 52 may move the steering wheel 24 to the extended position and to the retracted position, respectively.

Figure 6:
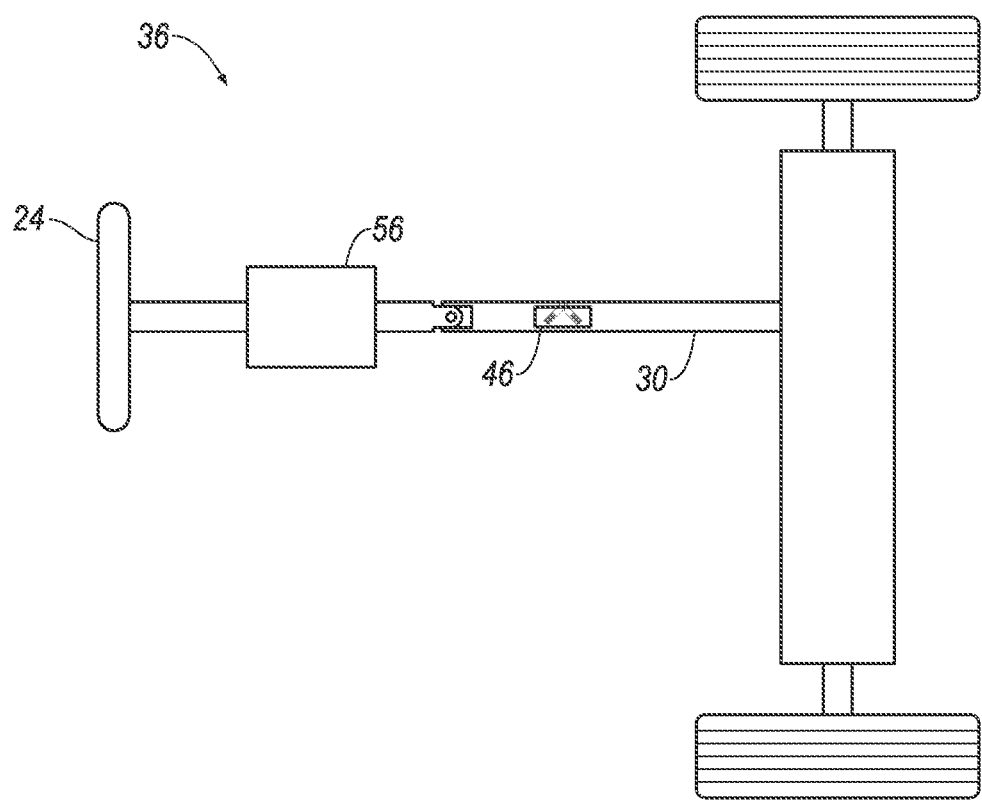
FIG. 6 is an illustration of another example of the steering.

With reference to FIG. 6, the steering 36 may include the clutch 56 connected to the torsion bar 30 and the steering wheel 24. Engagement of the clutch 56 may engage the steering wheel 24 with the torsion bar 30. Disengagement of the clutch 56 may disengage the steering wheel 24 from the torsion bar 30.

The ECU of the steering 36 may actuate the clutch 56, linear actuator 52, or other suitable structure, to engage or disengage the steering wheel 24 and the torsion bar 30, e.g., in response to the ECU of the steering 36 receiving an instruction from the computer 28.

Figure 7:
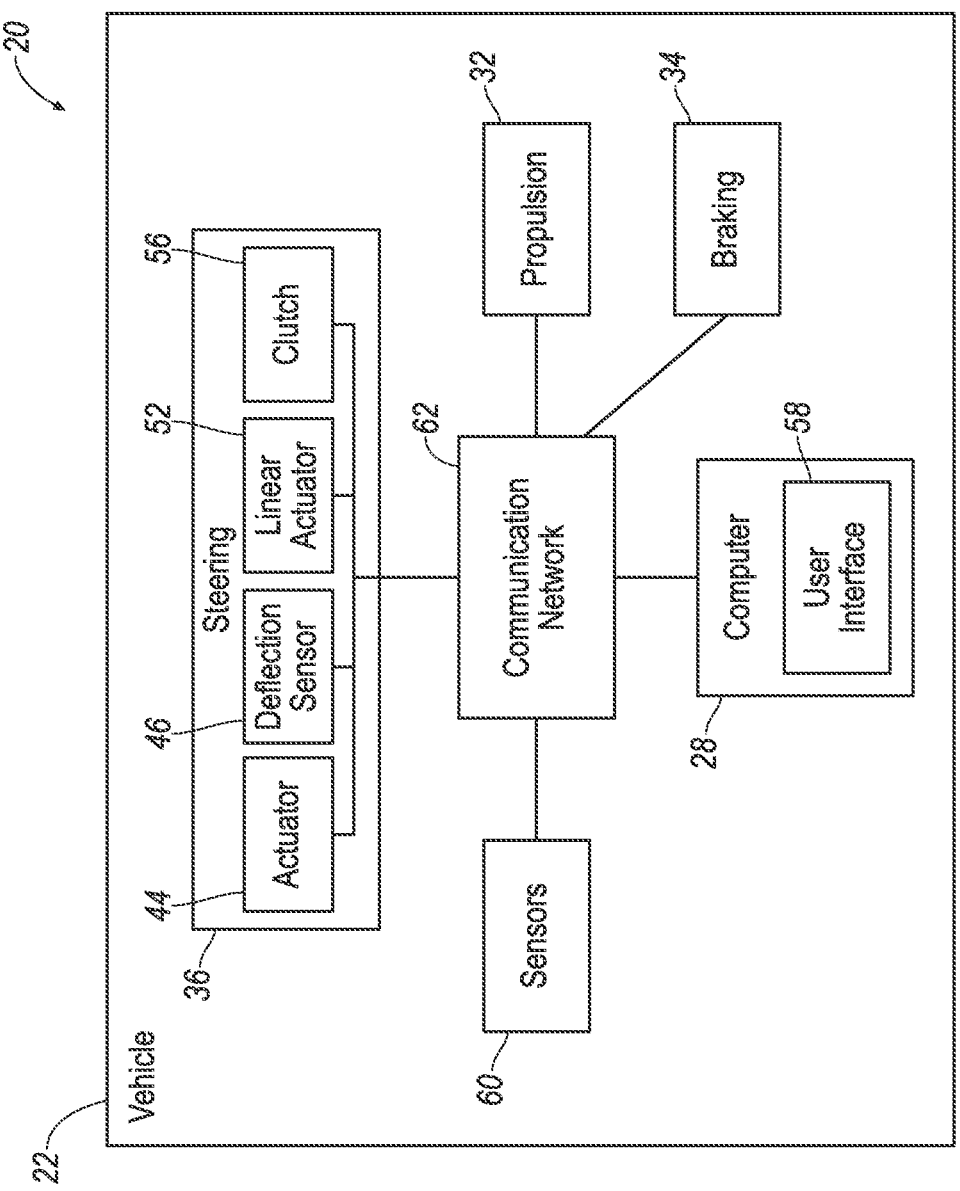
FIG. 7 is a block diagram illustrating components of the vehicle.

Turning now to FIG. 7, the vehicle 22 may include a user interface 58. The user interface 58 presents information to and receives information from an occupant of the vehicle 22, e.g., via inclusion in, and/or connection to, the computer 28. The user interface 58 may be located, e.g., on an instrument panel in a passenger cabin of the vehicle 22, or wherever may be readily seen by the occupant. The user interface 58 may include dials, digital readouts, lights, screens such as a touch-sensitive display screen, speakers, etc., for providing information to the occupant, e.g., human-machine interface (HMI) elements. The user interface 58 may include buttons, knobs, keypads, microphone, etc., for receiving information from the occupant.

The vehicle 22 may include sensors 60. The sensors 60 may detect internal states of the vehicle 22, for example, wheel speed, wheel orientation, and engine and transmission variables. The sensors 60 may detect the position or orientation of the vehicle 22, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 60 may detect the external world, for example, radar sensors, scanning laser range finders, light detection and ranging (LIDAR) devices, and image processing sensors such as cameras. The sensors 60 may include communications devices, for example, vehicle-to-infrastructure (V2I) or vehicle-to-vehicle (V2V) devices.

The vehicle 22 may include a communication network 62, shown in FIG. 7. The communication network 62 includes hardware, such as a communication bus, for facilitating communication among vehicle components, e.g., the propulsion 32, the braking 34, the steering 36, the sensors 60, the computer 28, etc. The communication network 62 may facilitate wired or wireless communication among the vehicle 22 components in accordance with a number of communication protocols such as controller area network (CAN), Ethernet, WiFi, Local Interconnect Network (LIN), and/or other wired or wireless mechanisms.

The computer 28, implemented via circuits, chips, or other electronic components, is included in the system 20 for carrying out various operations, including as described herein. The computer 28 is a computing device that includes a processor and a memory, the memory including one or more forms of computer-readable media, and storing instructions executable by the processor for performing various operations, including as disclosed herein. The memory of the computer 28 further generally stores remote data received via various communications mechanisms; e.g., the computer 28 is generally configured for communications on a controller area network (CAN) bus or the like, and/or for using other wired or wireless protocols, e.g., Bluetooth, etc. The computer 28 may also have a connection to an onboard diagnostics connector (OBD-II). Via the communication network 62, e.g., using Ethernet, WiFi, the CAN bus, Local Interconnect Network (LIN), and/or other wired or wireless mechanisms, the computer 28 may transmit messages to various devices in the vehicle 22 and/or receive messages from the various devices, e.g., the propulsion 32, the braking 34, the steering 36, the sensors 60, etc. Although one computer 28 is shown in FIG. 7 for ease of illustration, it is to be understood that the computer 28 could include, and various operations described herein could be carried out by, one or more computing devices.

The computer 28 may be programmed to actuate the steering 36 to engage the steering wheel 24 with the steering 36, e.g., with the torsion bar 30, and to disengage the steering wheel 24 from the steering 36. For example, the computer 28 may transmit an in instruction via the communication network 62 to the steering 36 instructing the linear actuator 52 to change length, e.g., to move the steering wheel 24 to the extended position or to the retracted position. As another example, the computer 28 may transmit an instruction via the communication network 62 to the steering 36 instructing the clutch 56 connected to the torsion bar 30 and the steering wheel 24 to engage or disengage.

The computer 28 may be programmed to determine whether the steering wheel 24 is engaged or disengaged with the steering 36, e.g., with the torsion bar 30, based on a detected deflection of the torsion bar 30. The computer 28 may detect the deflection of the torsion bar 30 based on information received from the deflection sensor 46, e.g., received via the communication network 62.

When the steering wheel 24 is engaged with the steering 36 a rotational inertia of the steering 36 is greater than when the steering wheel 24 is disengaged from the steering 36. Inertia, as is conventionally understood and in the present context, is a tendency to maintain current motion, or lack thereof. For example, inertia of the steering 36 means a tendency to maintain current movement, or lack thereof, of the rack 40, the torsion bar 30, etc. Inertia of the steering 36 may be quantified by an amount of force required from the actuator 44 to change motion of the steering 36, e.g., an amount of voltage supplied to the actuator 44 to stop the steering 36 at a position, to accelerate the steering 36 toward a position, etc. Inertia of the steering 36 when the steering wheel 24 is engaged with the steering 36 is higher than inertia of the steering 36 when the steering wheel 24 is disengaged from the steering 36. To put it another way, more force is required to change motion of the steering 36, e.g., to move the steering angle toward a certain position, to stop the steering angle at a position, etc., when the steering wheel 24 is engaged with the steering 36 than when the steering wheel 24 is disengaged from the steering 36. The greater the inertia, the greater the deflection of the torsion bar 30, e.g., resulting from increased torque applied to the torsion bar 30 to achieve a change in movement of the steering 36.

To determine whether the steering wheel 24 is engaged or disengaged with the steering 36, the computer 28 may compare a value of the detected deflection with a stored threshold value, e.g., 2 degrees. When the detected deflection is greater than the threshold value the computer 28 may determine the steering wheel 24 is engaged with the steering 36. When the detected deflection is less than the threshold value the computer 28 may determine the steering wheel 24 is disengaged from the steering 36. The threshold value may be selected from a set or range of values, e.g., different values for different vehicle speeds.

The threshold values may be determined by empirical testing. For example, deflection values of the torsion bar 36 may be recorded while the steering 36 is disengaged from the steering wheel 24 and is actuated to change the steering angle at various vehicle speeds. The recorded deflection values may be analyzed, e.g., using conventional statistical techniques to develop a bell curve, identify a mean and standard deviation, etc., to identify a range of deflection values of the torsion bar 30 while the steering 36 is disengaged from steering wheel 24. Deflection values of the torsion bar 36 may also be recorded while the steering 36 is engaged with the steering wheel 24 and is actuated to change the steering angle at various speeds. The recorded deflection values may be analyzed, e.g., using statistical methods to develop a bell curve, identify a mean and standard deviation, etc., to identify a range of deflection values of the torsion bar 30 while the steering 36 is engaged with steering wheel 24. The threshold values may be selected for various speeds, e.g., individual values at specific speeds, such that the threshold values are higher than the detected values while the steering 36 is disengaged from the steering wheel 24 and lower than the detected values while the steering 36 is engaged with the steering wheel 24.

The computer 28 may be programmed to actuate the user interface 58 to provide a status of whether the steering wheel 24 is engaged or disengaged from the steering 36. For example, the computer 28 may transmit an instruction including an indication of the status to the user interface 58 instructing illumination of a light of the user interface 58 indicating the status, instructing a screen of the user interface 58 to display the status, etc.

The computer 28 may be programmed to store one or more fault codes, e.g., in the memory of the computer 28. For example, a first fault code may indicate that the steering wheel 24 remains engaged with the steering 36, e.g., with the torsion bar 30, after the computer 28 actuates the steering 36 to disengage the steering wheel 24 from the steering 36. As another example, a second fault code may indicate that the steering wheel 24 remains disengaged from the steering 36 after the computer 28 actuates the steering 36 to engage the steering wheel 24 with the steering 36.

The computer 28 may be programmed to operate the steering 36 in the autonomous-mode, the semi-autonomous mode, or the non-autonomous mode. In the autonomous-mode the computer 28 may transmit one or more instructions to the steering 36 to change the steering angle of the wheel of the vehicle 22. In the semi-autonomous mode the computer 28 may transmit one or more instructions to the propulsion 32 and/or the braking 34, and refrain from transmitting instructions to the steering 36. In the semi-autonomous mode the computer 28 may transmit one or more instructions to the steering 36 and/or to one of the propulsion 32 and the braking 34. In the non-autonomous mode the computer 28 may refrain from transmitting instructions to the steering 36.

The computer 28 may operate the steering 36 in the autonomous-mode, the semi-autonomous mode, or the non-autonomous mode based on an instruction from the user interface 58 specifying a mode. For example, an operator of the vehicle 22 may provide an input to the user interface 58 indicating the autonomous-mode, the semi-autonomous mode, or the non-autonomous mode, and the user interface 58 may transmit an instruction to the computer 28 via the communication network 62 based on such input.

The computer 28 may select the autonomous-mode, the semi-autonomous mode, or the non-autonomous mode based on determining whether the steering wheel 24 is engaged or disengaged with the steering 36. For example, the computer 28 may select the semi-autonomous mode in which instructions to the steering 36 are not transmitted or the non-autonomous mode when the computer determines the steering wheel 24 is engaged with the steering 36. As another example, the computer 28 may select the non-autonomous mode or the semi-autonomous mode in which instructions to the steering 36 are transmitted when the computer determines the steering wheel 24 is engaged with the steering 36.

The computer 28 may be programmed to actuate the steering 36 to change the steering angle of the wheels of the vehicle 22. For example, the computer 28 may send an instruction via the communication network 62 to the actuator 44 that moves the rack 40. The instruction may instruct a motor to rotate, a linear actuator to change length, etc.

The computer 28 may instruct actuation of the steering 36 by providing input to the steering 36 according to parameters. The parameters are values that provide a measure of a variable used to control the steering 36, e.g., a maximum or minimum voltage to provide the actuator 44, a constant such as a gain constant, for use with control loop feedback programming, e.g., to actuate the steering 36 to a desired steering angle. The parameters may be stored in the memory of the computer 28. For example, the computer 28 may use proportional-integral-derivative control (PID control) to actuate the steering 36 to a desired steering angle.

The computer 28 may select parameters, such as conventional gain values for PID control, based on whether the steering wheel 24 and the steering 36 are engaged or disengaged. The gain values for PID control are unitless constants used to scale the proportional, integral, and derivative PID control inputs. The computer 28 may further select parameters based on a speed of the vehicle 22, e.g., as detected by the sensors 60. To put it another way, the computer 28 may select certain parameters for providing input to the steering 36 in response to determining whether the steering 36 and steering wheel 24 are engaged or disengaged, and in response to identifying the speed of the vehicle 22.

For example, the computer 28 may store a lookup table or the like associating a status or state of whether the steering wheel 24 and the steering 36 are engaged or disengaged, and various vehicle speeds, with various gain values. After the computer 28 determines whether the steering wheel 24 and the steering 36 are engaged or disengaged and identifies the vehicle speed, the computer 28 may use such information with the lookup table to select gain values to be used when providing input to the steering 36. The lookup table may be populated with gain values based on empirical testing. For example, various gain values may be tested at various vehicle speeds while the steering wheel 24 and steering 36 are engaged, and at various vehicle speeds while the steering wheel 24 and steering 36 are disengaged. The gain values for the lookup table may be selected from empirically tested gain values to optimize accuracy and speed of actuating the steering 36 to a desired steering angle, providing comfort to occupants of the vehicle 22, e.g., by reducing lateral jerk (which is the second derivative of lateral velocity, i.e., the first derivative of lateral acceleration), etc. For example, various gain values may be tested at various speeds while the steering 36 and the steering wheel 24 are engaged. While testing the gain values lateral acceleration and jerk of the vehicle 22 may be measured, an amount of time to reach a desired steering angle may be measured, an amount of oversteer may be measured, etc. The gain values for the lookup table may be selected based on the testing such that lateral acceleration and jerk do not exceed a threshold amount, the desired steering angle reached in a minimum amount of time and without oversteer, etc. The threshold amount of acceleration and jerk may be determined based on an occupant survey or the like where occupants of the vehicle 22 provide feedback on the performance of the vehicle 22, e.g., whether the lateral acceleration and/or jerk produced by actuating the steering 36 make riding in the vehicle 22 unpleasant. Additionally or alternately, computer simulation replicating the above described testing may be used to select gains values for inclusion in the lookup table. An example lookup table for use with PID control and including gain values selected by such testing is shown below. The gains values in the table were selected with real world empirical testing (as opposed to computer simulation) using a 2017 Ford Fusion Hybrid vehicle. Although shown as gain values associated with ranges of vehicle speeds, it is to be understood that gain values could be associated with specific speeds in the lookup table, with computer 28 calculating the gain values for providing input to the steering 36 via extrapolation based on the detected vehicle speed and the vehicle speeds and gains values in the table.

TABLE 1

| Inputs | | Outputs | | |
|---|---|---|---|---|
| Steering Wheel and Steering Engaged/Disengaged | Speed (kilometers per hour) | P-Gain Value | I-Gain Value | D-Gain Value |
| Engaged | 0-19 | 100 | 15 | 10 |
| Engaged | 20-39 | 80 | 14 | 15 |
| Engaged | 40-59 | 60 | 13 | 20 |
| Engaged | 60-79 | 40 | 12 | 22 |
| Engaged | 80+ | 35 | 11 | 24 |
| Disengaged | 0-19 | 90 | 12 | 15 |
| Disengaged | 20-39 | 70 | 11 | 17 |
| Disengaged | 40-59 | 50 | 10 | 18 |
| Disengaged | 60-79 | 30 | 9 | 19 |
| Disengaged | 80+ | 25 | 8 | 20 |

Process

Figure 8:
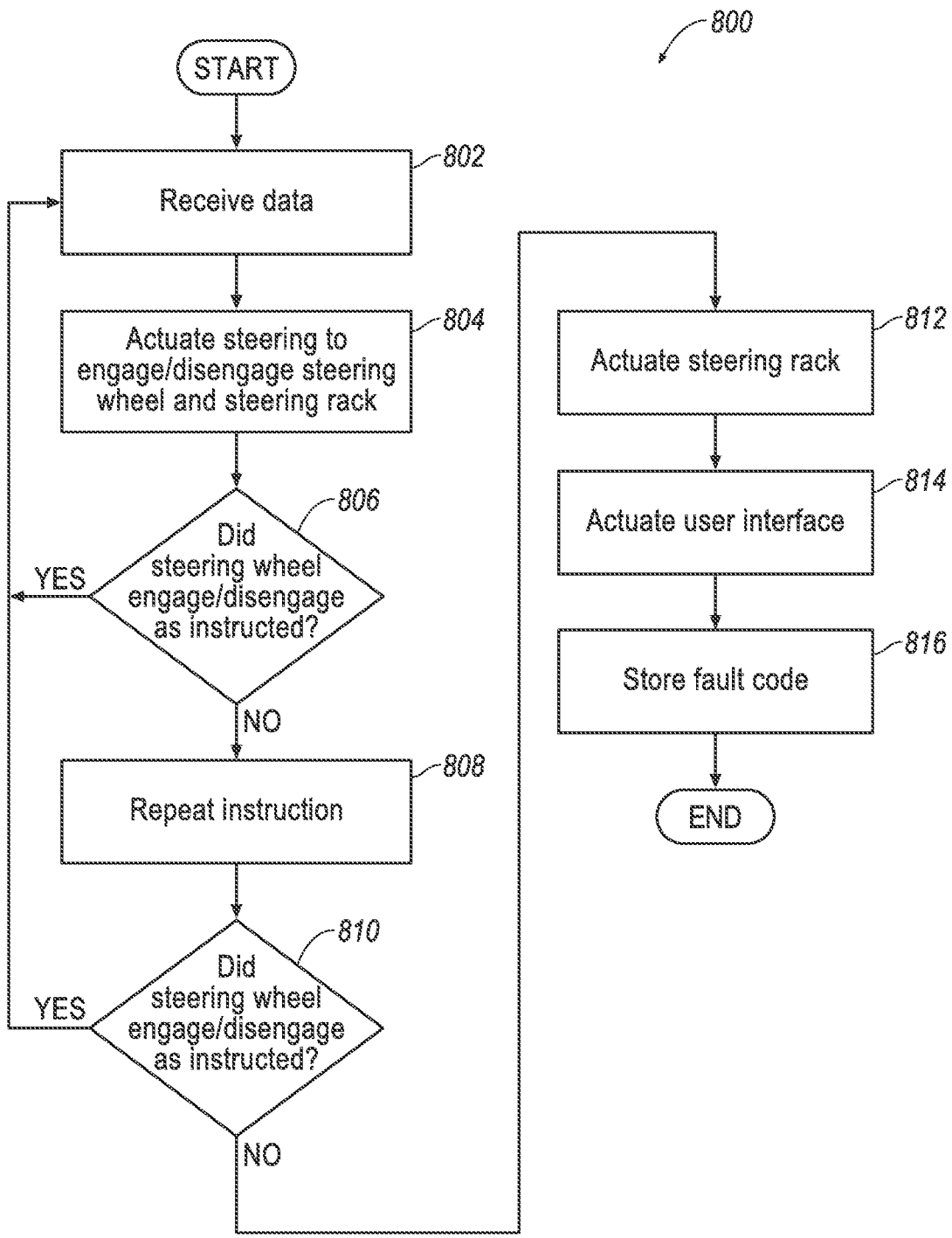
FIG. 8 is a flow chart illustrating an exemplary process for controlling the steering.

FIG. 8 is a process flow diagram illustrating an exemplary process 800 for controlling the vehicle 22 having the steering wheel 24 that may be engaged and disengaged from the steering 36. The process 800 may be performed by the computer 28.

The process 800 begins in a block 802, in which the computer 28 receives data, e.g., from the deflection sensor 46, the sensors 60, the user interface 58, etc., e.g., via the communication network 62. The computer 28 may continue to receive data throughout the process 800. Throughout the process 800 in the present context means substantially continuously or at time intervals, e.g., every 100 milliseconds.

Next, in a block 804, the computer 28 actuates the steering 36 to engage the steering wheel 24 with the steering 36 or to disengage the steering wheel 24 from the steering 36. For example, the computer 28 may transmit an instruction to the steering 36, e.g., to the ECU of the steering 36 via the communication network 62, instructing the linear actuator 52 to change length, or to the clutch 56 connected to the torsion bar 30 and the steering wheel 24, e.g., in response on an instruction received from the user interface 58.

Next, in a block 806, the computer 28 determines whether the steering wheel 24 is engaged or disengaged from the steering 36 based a detected deflection of the torsion bar 30, e.g., based on information from the deflection sensor 46, as described herein. The computer 28 compares the determined engagement or disengagement with the actuation to engage or disengage in the block 804. When the computer 28 determines the detected engagement or disengagement matches the actuation in the block 804, e.g., the computer 28 determines the steering wheel 24 is engaged with the steering 36 and the computer 28 had actuated the steering 36 to engage the steering wheel 24 with the steering 36 in the block 804, or vice versa, the process 800 returns to the block 802. When the computer 28 determines the detected engagement or disengagement does not match the actuation in the block 804, e.g., the computer 28 determines the steering wheel 24 is engaged with the steering 36 and the computer 28 had actuated the steering 36 to disengage the steering 36 from the steering wheel 24 in the block 804, or vice versa, the process 800 moves to a block 808.

In the block 808 the computer 28 again actuates the steering 36 to engage the steering wheel 24 with the steering 36 or to disengage the steering wheel 24 from the steering 36, i.e., the computer 28 repeats the instruction given in the most recent iteration of the block 804.

Next, in a block 810, the computer 28 again determines whether the steering wheel 24 is engaged or disengaged from the steering 36 based a detected deflection of the torsion bar 30, e.g., based on information from the deflection sensor 46, as described above, and compares the determined engagement or disengagement with the actuation to engage or disengage in the blocks 804 and 808. When the computer 28 determines the detected engagement or disengagement matches the actuation in the blocks 804 and 808, i.e., the detected engagement or disengagement is the same as the instructed engagement or disengagement in the blocks 804 and 805, the process 800 returns to the block 802. For example, matching could be when the computer 28 determines the steering wheel 24 is engaged with the steering 36 and the computer 28 had actuated the steering 36 to engage the steering wheel 24 with the steering 36 in the blocks 804 and 808, or vice versa When the computer 28 determines the detected engagement or disengagement does not match the actuation in the blocks 804 and 808, i.e., the detected engagement or disengagement is not the same as the instructed engagement or disengagement in the blocks 804 and 805, the process 800 moves to a block 812. For example, not matching could be when the computer 28 determines the steering wheel 24 is engaged with the steering 36 and the computer 28 had actuated the steering 36 to disengage the steering 36 from the steering wheel 24 in the blocks 804 and 808, or vice versa.

In the block 812 the computer 28 actuates the steering 36 based on the determination of whether the steering wheel 24 is engaged or disengaged from the steering 36. For example, the computer 28 may actuate the steering 36 by providing input to the steering 36 according to one or more parameters selected according to the determination. For example, the parameters may indicate a gain value, e.g., to be used when actuating the steering 36 with PID control, e.g., as described herein. As another example, the computer 28 may actuate the steering 36 in one of an autonomous-mode, a semi-autonomous mode and a non-autonomous mode based on the determination. The computer 28 may actuate the steering 36 in the semi-autonomous mode or the non-autonomous mode, e.g., by refraining from transmitting instructions to the steering 36 and permitting operator control of the steering 36 via the steering wheel 24, when the computer 28 determines the steering wheel 24 is engaged with the steering 36 in the blocks 806 and 810. The computer 28 may actuate the steering 36 in the autonomous mode or the semi-autonomous mode, e.g., by transmitting instructions to the steering 36, when the computer 28 determines the steering wheel 24 is disengaged from the steering 36 in the blocks 806 and 810.

Next, in a block 814, the computer 28 actuates the user interface 58 to provide a status of whether the steering wheel 24 is engaged or disengaged from the steering 36. For example, the computer 28 may transmit an indication of the status to the user interface 58, e.g., via the communication network 62, along with an instruction to display such status.

Next, in a block 816, the computer 28 stores a fault code based on the determination made in the block 806 and 810. The computer 28 may store a fault code indicating that the steering wheel 24 and the steering 36 are engaged, and will not disengage, upon determining the steering wheel 24 is engaged with the steering 36. The computer 28 may store a fault code indicating that the steering wheel 24 and the steering 36 are disengaged, and will not engage, upon determining the steering wheel 24 is disengaged from the steering 36. After the block 816, the process 800 may end. Alternately, the process 800 may return to the block 802.

CONCLUSION

Computing devices, such as the computer 28, the ECU of the steering 36, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The article "a" modifying a noun should be understood as meaning one or more unless stated otherwise, or context requires otherwise. The phrase "based on" encompasses being partly or entirely based on.

The adjectives "first" and "second" are used throughout this document as identifiers and are not intended to signify importance or order.

What is claimed is:

1. A system, comprising a processor and a memory storing program instructions executable by the processor to:
    determine that a steering wheel is one of engaged and disengaged with a steering based on a detected torsional deflection of a steering torsion bar;
    actuate a user interface to provide a status of whether the steering wheel is engaged or disengaged from the steering; and
    actuate the steering based on the determination.

2. The system of claim 1, wherein the memory further stores instructions to actuate the steering based on the determination by providing input to the steering according to one or more parameters selected according to the determination.

3. The system of claim 2, wherein the one or more parameters indicate a gain value.

4. The system of claim 1, wherein the memory further stores instructions to actuate the steering in one of an autonomous-mode, a semi-autonomous mode and a non-autonomous mode based on the determination.

5. The system of claim 1, wherein the memory further stores instructions to actuate the steering to disengage the steering wheel upon determining the steering wheel is engaged with the steering.

6. The system of claim 1, wherein the memory further stores instructions to store a first fault code upon determining the steering wheel is engaged with the steering, and to store a second fault code that is different than the first fault code upon determining the steering wheel is disengaged from the steering.

7. A system, comprising a processor and a memory storing program instructions executable by the processor to:
    determine that a steering wheel is one of engaged and disengaged with a steering based on a detected torsional deflection of a steering torsion bar; and
    actuate the steering based on the determination by providing input to the steering according to one or more parameters selected according to the determination.

8. The system of claim 7, wherein the one or more parameters indicate a gain value.

9. The system of claim 7, wherein the memory further stores instructions to actuate the steering in one of an autonomous-mode, a semi-autonomous mode and a non-autonomous mode based on the determination.

10. The system of claim 7, wherein the memory further stores instructions to actuate the steering to disengage the steering wheel upon determining the steering wheel is engaged with the steering.

11. The system of claim 7, wherein the memory further stores instructions to store a first fault code upon determining the steering wheel is engaged with the steering, and to store a second fault code that is different than the first fault code upon determining the steering wheel is disengaged from the steering.

12. A system, comprising a processor and a memory storing program instructions executable by the processor to:
    determine that a steering wheel is one of engaged and disengaged with a steering based on a detected torsional deflection of a steering torsion bar;
    actuate the steering based on the determination; and
    actuate the steering to disengage the steering wheel upon determining the steering wheel is engaged with the steering.

13. The system of claim 12, wherein the memory further stores instructions to actuate the steering based on the determination by providing input to the steering according to one or more parameters selected according to the determination, the one or more parameters indicating a gain value.

14. The system of claim 12, wherein the memory further stores instructions to actuate the steering in one of an autonomous-mode, a semi-autonomous mode and a non-autonomous mode based on the determination.

15. The system of claim 12, wherein the memory further stores instructions to store a first fault code upon determining the steering wheel is engaged with the steering, and to store a second fault code that is different than the first fault code upon determining the steering wheel is disengaged from the steering.

\* \* \* \* \*